United States Patent [19]

Shiraishi

[11] Patent Number: 5,064,260
[45] Date of Patent: Nov. 12, 1991

[54] OPTICAL SCANNING UNIT OPERATING UNDER CHANGING TEMPERATURE AND MOISTURE CONDITIONS

[75] Inventor: Takashi Shiraishi, Tokyo, Japan

[73] Assignee: Kabushiki Kaisha Toshiba, Kawasaki, Japan

[21] Appl. No.: 570,847

[22] Filed: Aug. 22, 1990

[30] Foreign Application Priority Data

Aug. 31, 1989 [JP] Japan ................................. 1-225448

[51] Int. Cl.⁵ .............................................. G02B 26/10
[52] U.S. Cl. ...................................... 350/6.8; 350/6.7; 350/6.1; 346/108
[58] Field of Search .................. 350/6.7, 6.8, 253, 429, 350/6.1, 6.5; 346/108, 160; 358/296, 63, 87, 208, 213.16; 355/55; 250/235, 235 G

[56] References Cited

U.S. PATENT DOCUMENTS

| | | | |
|---|---|---|---|
| 4,731,623 | 3/1988 | Oda et al. ............................... | 350/6.7 |
| 4,866,459 | 9/1989 | Tokita et al. .......................... | 346/108 |
| 4,977,412 | 12/1990 | Komori et al. ........................ | 346/108 |

FOREIGN PATENT DOCUMENTS 61-59311 3/1986 Japan .

*Primary Examiner*—Loha Ben
*Attorney, Agent, or Firm*—Foley & Lardner

[57] ABSTRACT

In an optical unit incorporated in a laser beam printer, a light beam generated by a laser diode is converted by a group of conversion lenses into a light beam having a predetermined-size cross section. The light beam is directed toward a photosensitive body by a scanner unit, so as to scan the photosensitive body. A group of focusing lenses allow the rotating angle of the mirrors of the scanner unit to correspond to a desirable point on the surface of the photosensitive body. In other words, the rotating angle is made to correspond to the distance between the optical axis center determined with respect to a main scanning direction and a point to which the light beam is irradiated for scanning. The conversion lenses include at least one aspheric glass lens, and at least two plastic lenses which are formed of the same material. The focusing lenses include at least one plastic lens which is formed of the same material as the plastic lenses included in the converting lenses. With respect to these lenses, optical corrections are made to eliminate adverse effects which may be caused by temperature and/or moisture-dependent focal length variation and by temperature- and/or moisture-dependent deformation of the plastic lenses.

9 Claims, 6 Drawing Sheets

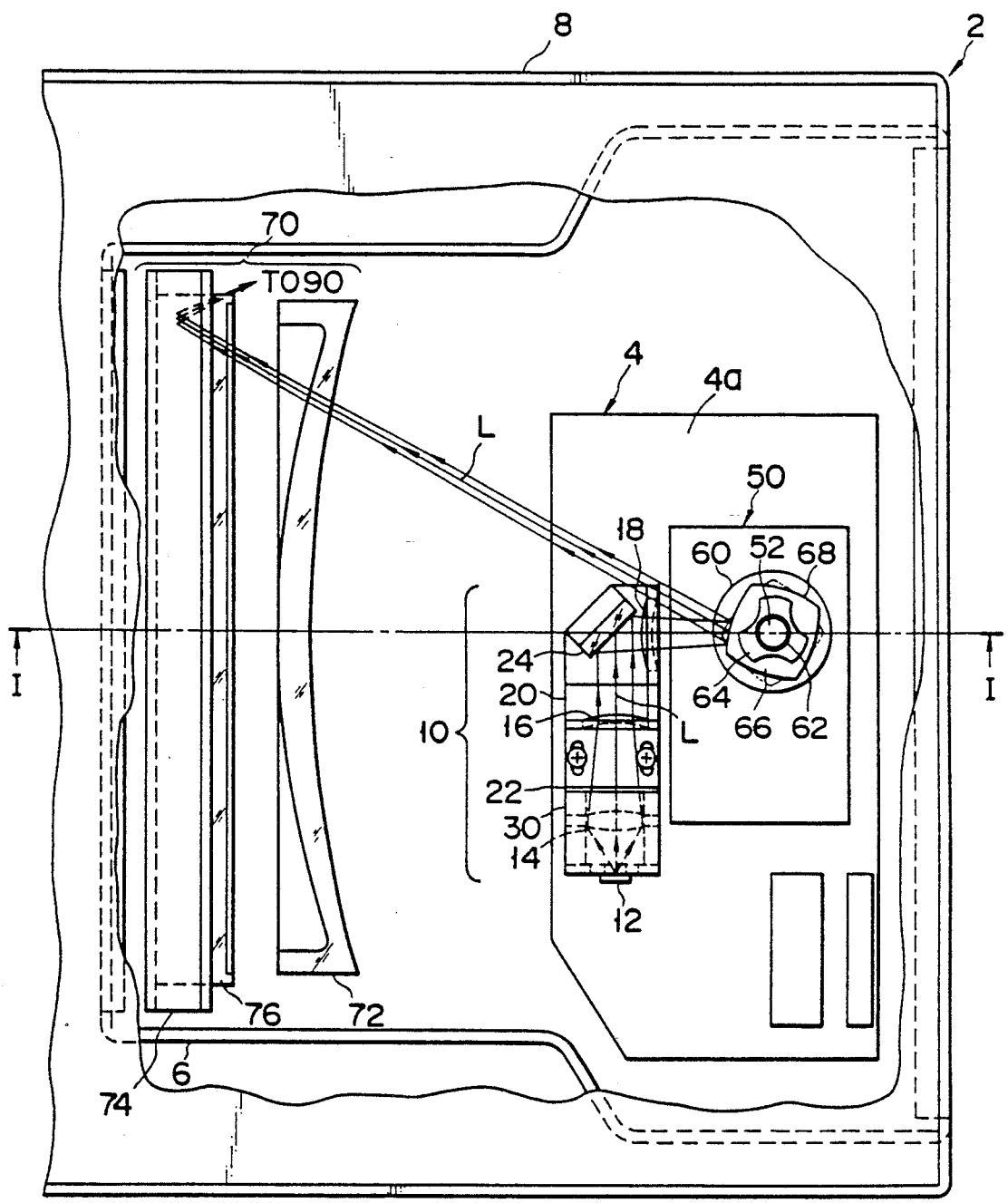
F I G. 1A

OPTICAL SCANNING UNIT OPERATING UNDER CHANGING TEMPERATURE AND MOISTURE CONDITIONS

BACKGROUND OF THE INVENTION

1. Field of the Invention

The present invention relates to an optical unit for use in a laser beam printer, and more particularly to an optical unit which guides a laser beam from a laser diode to an object to be scanned, by way of a group of focusing lenses and a scanner.

2. Description of the Related Art

In general, an optical unit incorporated in a laser beam printer or the like is designed such that a laser beam output from a laser diode is guided first to a scanner, i.e., an optical deflector and then to a photo-sensitive body, i.e., an object to be scanned. The photosensitive body is scanned with the laser beam at a constant speed. Before reaching the photosensitive body, the laser beam passes through a first optical system and a second optical system. The first optical system converges the laser beam generated by the laser diode, while the second optical system focuses the laser beam to a desirable position on the surface of the photosensitive body. When passing through the first and second optical systems, the laser beam is made to have a cross section of predetermined size.

The first optical system is a combination of lenses, such as an aspheric surface glass lens, plastic lenses, etc. The second optical system is a combination of lenses, such as an fθ lens. By this fθ lens, the deflection angle at which a laser beam is deflected by the scanner is changed in proportion to the position at which the laser beam is focused on the photosensitive body and which is expressed in relation to the main scanning direction.

Published Unexamined Japanese Patent Application (PUJPA) No. 61-59311 discloses an fθ lens which is incorporated in such a second optical system as mentioned above and which has its ends supported by means of bimetal. Since the fθ lens is supported by bimetal, a variation in the focal length, which may occur due to a change in the ambient temperature, can be corrected.

In the system disclosed in the above mentioned Japanese Patent Application, the focal length of the fθ lens can be corrected in accordance with the ambient temperature. It should be noted, however, the system is not designed in consideration of adverse effects which may be caused by the ambient moisture, such as a variation in the focal length, deformation of a plastic lens, a variation in the refractive power, and a variation in the wave-length of a generated laser beam. Thus, satisfactory correction cannot be expected in the system of is Japanese Patent Application. It should be also noted that the correction using bimetal is not very reliable. Specifically, the amount of correction is not always constant, due to the thickness of the bimetal. In addition, since the lens itself is moved for correction, its optical axis may tilt, resulting in geometric distortion in the entire focusing system.

SUMMARY OF THE INVENTION

Accordingly, an object of the present invention is to provide a lens-holding structure which is for use in an optical unit incorporated in a laser beam printer or the like, and which prevents focal lengths of lenses from varying in spite of a change in the ambient temperature.

Another object of the present invention is to provide a group of lenses which are for use in an optical unit incorporated in a laser beam printer or the like and the focal lengths of which are prevented from varying in spite of a change in the ambient temperature and moisture.

Still another object of the present invention is to provide an optical unit which is made up of a low-in-price parts or components and which can be manufactured at low cost.

A further object of the present invention is to provide an optical unit which is compact in size.

The present invention provides an optical unit which is to be incorporated in a laser beam printer or the like and which comprises: means for generating a laser beam; means for converting the generated laser beam into a convergent laser beam, the converting means including a first lens which has power of one polarity in a main scanning direction, and a second lens which has power of the opposite polarity in the main scanning direction, the first and second lenses having focal lengths which vary in complementary to each other; means for directing the laser beam emitted from the converting means toward an object, so as to scan the object with the laser beam; and means for guiding the convergent laser beam directed toward the object while processing the convergent laser beam to have a cross section of predetermined size and shape, and for focusing the convergent laser beam onto a desirable portion on the surface of the object.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1A is a plan view of an optical unit according to one embodiment of the present invention;

DETAILED DESCRIPTION OF THE PREFERRED EMBODIMENTS

Figure 1B:
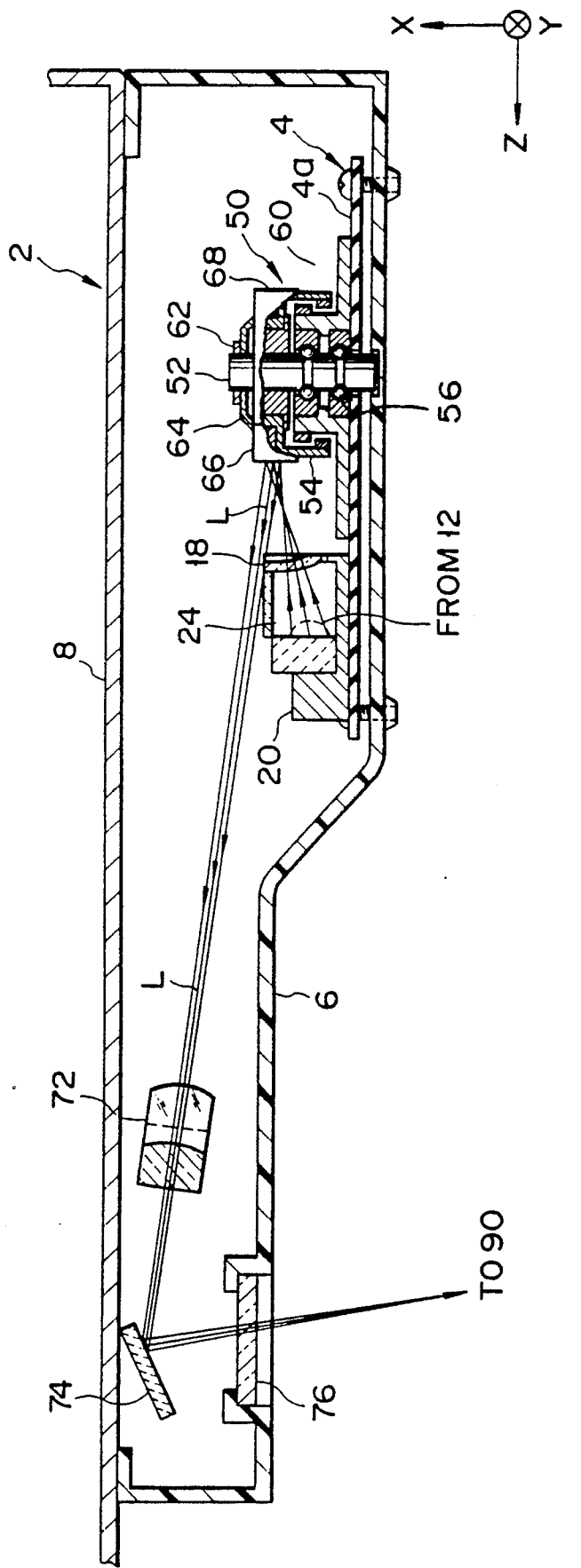
FIG. 1B is a sectional view taken along line I—I in FIG. 1.
Figure 2A:
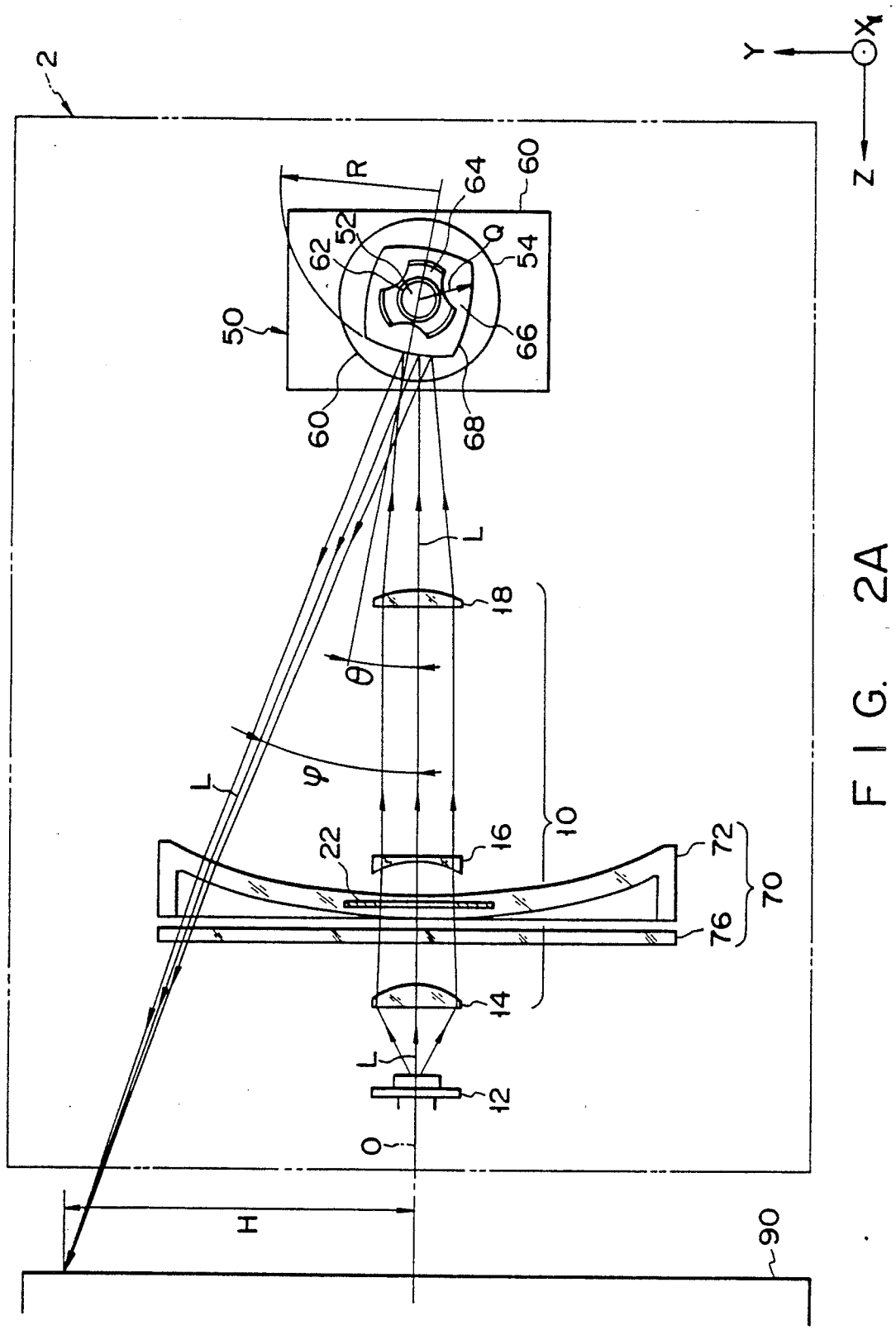
FIG. 2A is a plan view showing the arrangement of optical components of the optical unit, along with laser beam paths.
Figure 2B:
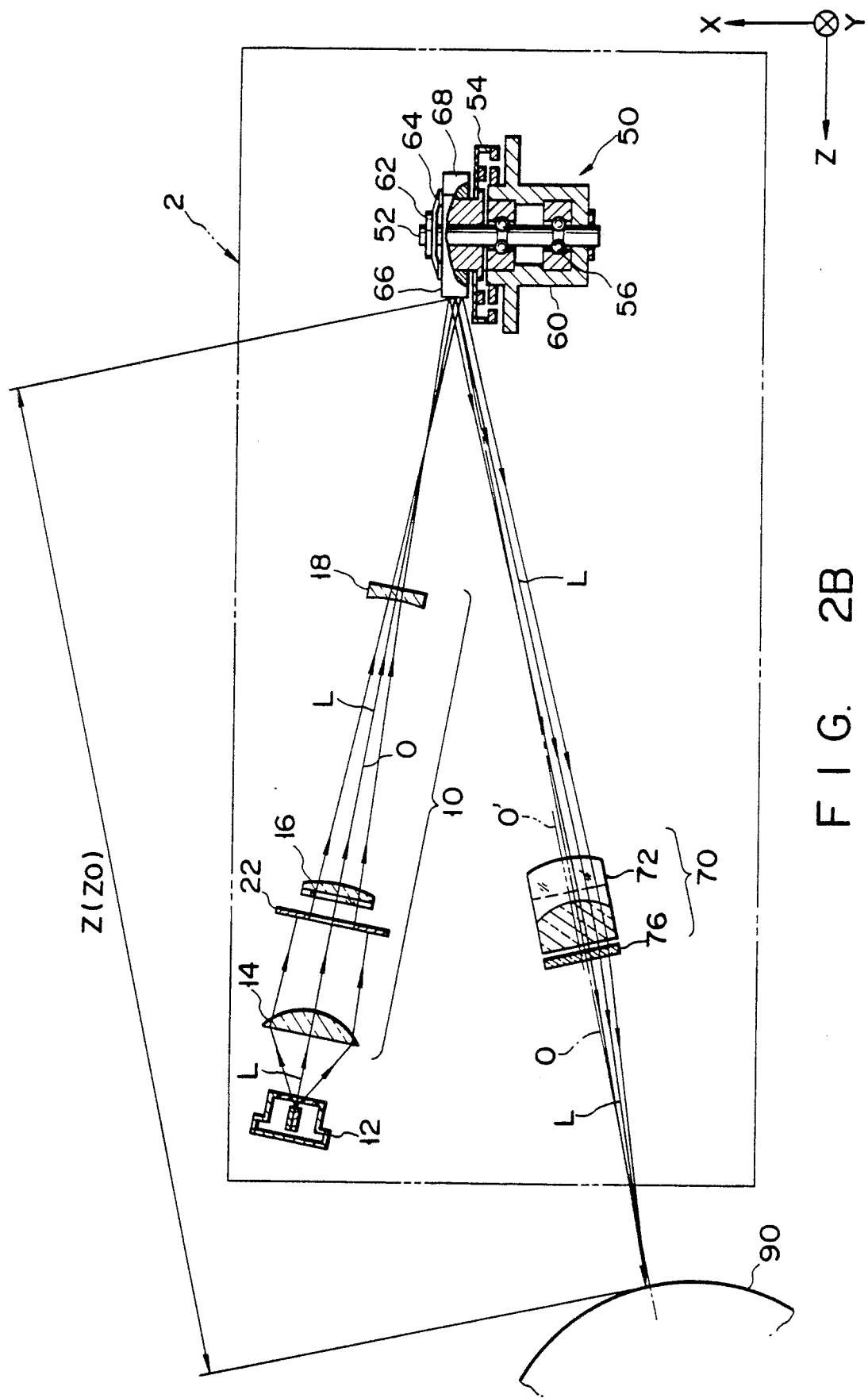
FIG. 2B is a sectional view showing the laser beam paths, the sectional view being obtained by taking the plan view shown in FIG. 2A along a plane which is in the vicinity of a center determined with reference to a main scanning direction.

An embodiment of the present invention will now be described, with reference to the accompanying drawings. As is shown in FIGS. 1A and 1B, an optical unit 2 is provided with an outer housing 6 and a base plate 8. The base plate 8 covers the outer housing 6 and seals the interior of the optical unit 2. The base plate 8 constitutes part of a laser beam printer. The outer housing 6 contains: a laser diode 12 for generating a laser beam L; a laser scanning device 4 made up of a first optical system 10 and a scanner 50 which are integrally arranged; and a second optical system 70. The first optical system 10 includes a group of conversion lenses, while the second optical system 70 includes a group of focusing lenses. Although not shown, the optical unit 2 further contains a monitoring optical device which horizontally synchronize a laser beam L and data signal, guided through the first and second optical systems 10 and 70 and used for scanning a photosensitive body 90.

Figure 3A:
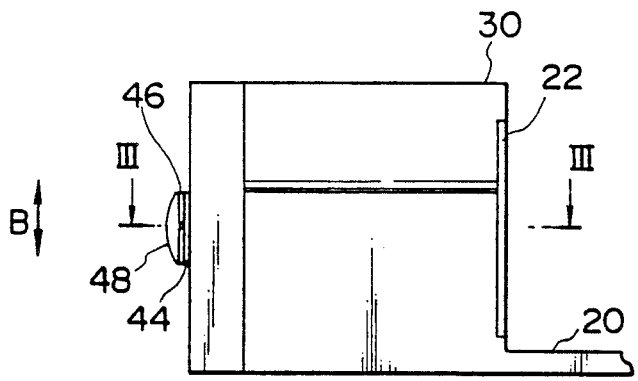
FIG. 3A is a side view of a lens barrel which is to be incorporated in the optical unit shown in FIGS. 1A and 1B and by which a focusing optical system, a light source, etc. are held.
Figure 3B:
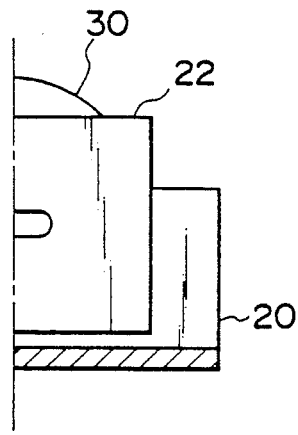
FIG. 3B is a right side view of the lens barrel shown in FIG. 3A.
Figure 3C:
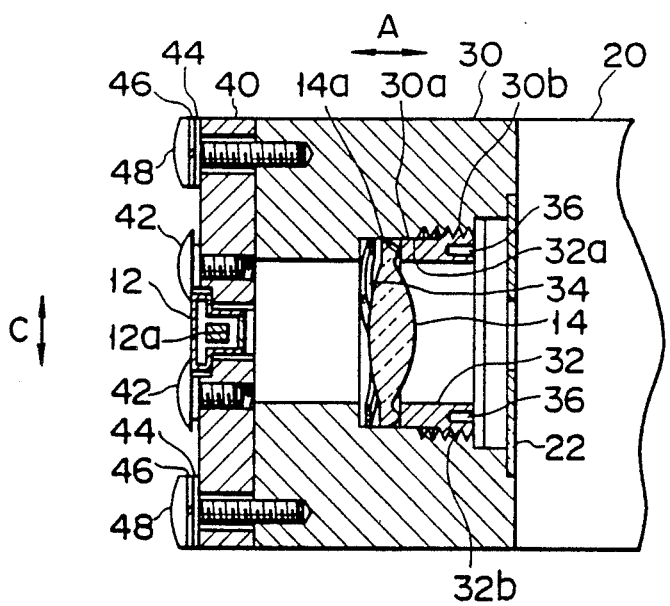
FIG. 3C is a sectional view taken along line III—III shown in FIG. 3A.

The laser scanning device 4 is mounted on an insulating base 4a. This insulating base 4a need not be used if the outer housing 6 is formed of an insulating material. As is shown in FIGS. 3A–3C, the laser diode 12 and at least one lens of the first optical system 10 are assembled in such a manner as to constitute a lens barrel 30.

The laser beam L generated by the laser diode 12 is converged when it passes through the first optical system 10. The laser beam L is directed to the scanner 50, by which it is reflected toward the photosensitive body 90, so as to scan at a nonuniform angular velocity. The laser beam L reflected by the scanner 50 is directed first to the second optical system 70. By this second optical system 70, the angle at which the reflecting face of the scanner 50 is rotated is made to correspond to the predetermined position on the surface of the photosensitive body 90, i.e., the distance for which the laser beam L scans in the main scanning direction from the center of the optical axis to a given point. The laser beam L directed from the second optical system 70 is focused on the photosensitive body 90, is modified or ON-OFF controlled by additional units such as a beam modulator, a data input device, etc., (not shown) to form character data and/or graphics data to the surface of the photosensitive body 90. As a result, an electrostatic latent image is formed on the circumferential surface of the photosensitive body 90.

The photosensitive body 90 is rotated in a predetermined direction by a driver (not shown). The electrostatic latent image is formed in accordance with the rotation of the photosensitive body 90. The electrostatic latent image, thus formed, is developed by a developing means (not shown), and is then transferred onto a given medium (not shown).

Part of the laser beam L passing through the second optical system 70 is reflected by a horizontal synchronization-detecting mirror (not shown) at each scan performed in the main scanning direction. The reflected laser beam L is guided to a synchronization signal detector (not shown), for the detection of horizontal synchronization.

The first optical system 10 includes: a glass lens 14 which converges the laser beam L produced by the laser diode 12; first plastic lens 16 which collimates the laser beam, converged by the glass lens 14, in the main scanning direction; and second plastic lens 18 which converges the laser beam, converged by the first plastic lens 16, in the main and sub scanning direction.

The glass lens 14 is a convex lens formed of optical glass, such as BK7, etc. As is seen in FIGS. 3A–3C, it has a flange 14a by means of which it is held to a lens barrel 30. The first plastic lens 16 is formed of, e.g., polymethyl methacrylate (PMMA) and has toric surfaces. The toric surfaces have negative power in the main scanning direction and slightly-negative power in the sub-scanning direction. Although not shown, the first plastic lens 16 has a flange by means of which it is attached to a housing 20. It also has either a positioning projection or a positioning hollow section formed substantially in the center with respect to the main scanning direction.

Like the first plastic lens 16, the second plastic lens 18 is formed of, e.g., PMMA. It has toric surfaces which have positive power in the main scanning direction and negative power in the sub-scanning direction. Although not shown, the second plastic lens 18 has a flange by means of which it is attached to the housing 20. It also has either a positioning projection or a positioning hollow section formed substantially in the center with respect to the main scanning direction.

The scanner 50 includes a polygonal mirror 66 having a plurality of deflecting mirror surfaces 68. Each deflecting mirror surface 68 which is convex in the main scanning direction. In other words, the deflecting mirror surface 68 is curved with a predetermined radius R of curvature. The number of deflecting mirror surfaces 68 is four in this embodiment, but may be a multiple of four. The polygonal mirror 66 is driven by an axial gap type motor 60. This motor 60 contains: a rotor 54 which is integral with the rotating shaft 52 of the motor 60; a direct bearing 56 which supports the rotating shaft 52 in such a manner as to allow smooth rotation; etc. The polygonal mirror 66 is reliably fixed to the rotor 54 by means of a stop ring 62 and a spring member 64.

The second optical system 70 includes a third plastic lens 72 for focusing a laser beam L on the surface of the photosensitive body 90, and a dust-preventing cover 76 for sealing the above-mentioned optical members of the optical unit 2. With respect to the main scanning direction, the third plastic lens 72 has a face which is shaped to satisfy the relationship expressed by $H = f\theta$. In other words, the distance over which the laser beam L ought to move from the optical axis in the main scanning direction in proportion to the angle $\theta$, at which the polygonal mirror 66 or each mirror surface 68 thereof is rotated, is made to correspond to the distance H for which the laser beam L scans the photosensitive body 90 in the main scanning direction from the center of the optical axis. With respect to the subscanning direction, the third plastic lens 72 functions as a kind of f0 lens which has positive power and which is curved such that the power decreases in accordance with an increase in the deflection angle $\Phi$ with respect to the main scanning direction. Like the first plastic lens 16, the third plastic lens 72 is formed of, e.g., PMMA and has either a positioning projection or a positioning hollow section formed substantially in the center with respect to the main scanning direction.

The dust-preventing cover 76 is a transparent glass or plastic plate. It is formed of optical plate, such as BK7, filter glass, PMMA, or the like. It has a thickness of 2–3 mm, and permits the laser beam L to pass therethrough. In order to cut off a light having such a wavelength as adversely affects the photosensitive body 90, the dust-preventing cover 76 may be provided with a sharp cut filter function.

The first optical system 10 (i.e., lenses 14, 16 and 18) and the second optical system 70 (i.e., lens 72) are arranged in such a manner that their optical axes form a predetermined angle in a plane expanding in the sub-scanning direction. The laser diode 12 and lenses 14, 16 and 18 of the first optical system 10 are integrally assembled together and are held by the housing 20. The housing 20 contains the lens barrel 30 which will be detailed later with reference to FIGS. 3A-3C. A stop 22 which restricts the intensity or amount of convergent laser beam L, and a first mirror 24 which is arranged between the first and second plastic lenses 16 and 18 to change the traveling direction of the laser beam L, are also held by the housing 20. It should be noted that a second mirror 74 is arranged between the third plastic lens 72 and the dust-preventing cover 76, so as to change the traveling direction of the laser beam L.

The laser beam L generated by the laser diode 1 is converged by the glass lens 14 such that it becomes a converged or collimated laser beam L. When passing through the stop 22, the laser beam L is shaped to have a predetermined cross section. The laser beam emerging from the stop 22 is guided to the first plastic lens 16. When passing through the first plastic lens 16, the laser beam L is collimated in the main scanning direction and is converged in the sub-scanning direction. The laser beam L, thus processed, is then directed to the second plastic lens 18 via the first mirror 24, as is seen in FIGS. 1A and 1B. When passing through the second plastic lens 18, the laser beam L is converged in both the main scanning direction and sub-scanning direction.

The power of the first plastic lens 16 and that of the second plastic lens 18 have such polarities as will cancel each other in main scanning direction. Where the first plastic lens 16 is provided with positive power, the second plastic lens 18 is provided with negative power. Conversely, where the first plastic lens 16 is provided with negative power, the second plastic lens 18 is provided with positive power.

The laser beam L emerging from the second plastic lens 18 is directed to one deflecting mirror surface 68 of the polygonal mirror 66 of the scanner 50. After being reflected by the deflecting mirror 68, the laser beam L is directed at a nonuniform angular velocity to the third plastic lens 72, which functions as a kind of f0 lens, as mentioned above. In the main scanning direction, the third plastic lens 72 suppresses the adverse effects caused by the field curve and corrects the distortion aberration to have a desirable value. In the main scanning direction, the third plastic lens 72 suppresses the adverse effects caused by the field curve and corrects the distortion aberration to have a desirable value. In the sub-scanning direction, the third plastic lens 72 corrects the positional shift of the laser beam L on the photosensitive body 90, even if each mirror surface 68 of the polygonal mirror 66 tilts. The laser beam L emerging from the third plastic lens 72 is directed to the photosensitive body 90 by way of the dust-preventing cover 76 which is mounted on the housing 6 of the optical unit 2.

The first, second and third plastic lenses 16, 18 and 72 are formed of the same kind of plastics, so that their operations are complementary to one another. For example, if the temperature of the optical unit 2 increases, the absolute value of power of the positive-power lens decreases, thus slightly converging a laser beam L. However, since the absolute value of power of the negative-power lens which is paired with the positive-power lens decreases, the laser beam L is slightly diffused at the same time. As a result, the cross section of the laser beam L has substantially the same shape and size, before and after it passes through the lenses.

The lenses 14, 16 18, and 72 and the scanner 50 used in the embodiment have such optical characteristics as are shown in Tables 1 and 2 below.

TABLE 1

(Lens characteristics with respect to main scanning direction)

| | First Focusing System | | | | Second Focusing System |
| --- | --- | --- | --- | --- | --- |
| | Glass lens 14 | Lens 16 | Lens 18 | Polygonal Mirror 66 | Lens 72 |
| i | 1 | 2 | 3 | 4 | 5 |
| Power P | 0.0907035 | −0.0134704 | 0.0134029 | −0.025109855 | −9.92445 × $10^{-4}$ |
| Focal Length f | 11.0294 | −74.2368 | 74.6107 | −39.825 | −1.00761 × $10^3$ |
| $1/v'$ | 3.6 × $10^{-4}$ | 0.009685 | 0.009685 | 7.08 × $10^{-4}$ | 9.685 × $10^{-3}$ |
| h | 4.15011443 | 3.433239 | 3.433287 | 1.50184 | 0.660993 |
| $h^2/fv'$ | 5.624 × $10^{-4}$ | −0.001538 | 0.00153 | −4.010 × $10^{-5}$ | −4.200 × $10^{-6}$ |

TABLE 2

(Lens characteristics with respect to main scanning direction)

| | First Focusing System | | | | Second Focusing System |
| --- | --- | --- | --- | --- | --- |
| | Glass lens 14 | Lens 16 | Lens 18 | Polygonal Mirror 66 | Lens 72 |
| i | 1 | 2 | 3 | 4 | 5 |
| Power P | 0.0907035 | −0.00094897 | −0.0530289 | 0.0 | 0.0221932 |
| Focal Length f | 11.0294 | −1053.77 | −18.8576 | ∞ | 45.0588 |
| $1/v'$ | 3.6 × $10^{-4}$ | 0.09685 | 0.009685 | 7.08 × $10^{-3}$ | 9.685 × $10^{-3}$ |
| h | 1.68167 | 1.19603 | 0.2421888 | 0.048039 | −0.450092 |
| $h^2/fv'$ | 9.234 × $10^{-5}$ | −1.315 × $10^{-5}$ | −3.012 × $10^{-5}$ | 0.0 | 4.354 × $10^{-5}$ |

Next, a description will be given of a structure used for converting the laser beam L generated by the laser diode into a laser beam L having a cross section of desirable size.

Referring to FIGS. 3A–3C, the glass lens 14 is secured to the lens barrel 30 by means of a push member 32 and an elastic member 34, e.g., a wave washer, etc. The lens barrel 30 is formed of a material which has a coefficient of thermal expansion that does not adversely affect the glass lens 14, and which enables high working accuracy and is sufficiently rigid. For example, the lens barrel 30 is formed of zinc or aluminum. The push member 32 includes a cylindrical portion 32a and a screw portion 32b. The cylindrical portion 32a has a pressing part on that side which contacts the glass lens 14. The position of the glass lens 14 can be adjusted in the direction indicated by arrow A by turning the push member 32. The glass lens 14 has a flange 14a. Since this flange 14a and the pressing part of the cylindrical portion 32a are in line contact with each other, the torque required for turning the push member 32 is small. On the opposite side of the pressing part, a hole 36 is formed in the push member 32. When the position of the glass lens 14 is adjusted, a specially-designed tool is inserted into the hole 36, and the push member 32 is turned by use of the tool. The wave washer 34 urges the glass lens 14 toward the push member 32, and this urging force is constantly applied to the screw portion 32b of the push member 32. Therefore, unnecessary play is not produced between the screw portion 32b of the push member 32 and the ridge of the screw portion 30b of the lens barre 30. In this fashion, the glass lens 14 is accurately secured to the appropriate position of the lens barrel 30.

The laser diode 12 is fixed to a laser diode holder 40 by means of a screw 42. The position of the laser diode holder 40 can be adjusted in the directions indicated by arrows B and C, so that the laser diode holder 40 can be positioned in a desirable manner with reference to the lens barrel 30. The laser diode holder 40 is pressed against the lens barrel 30 with desirable pressure by means of a spring washer 46, a flat washer 44, and a screw 48. With this structure, the direction in which the major component of the laser beam L of the laser diode 12 is emitted can be easily adjusted with reference to the optical axis of the glass lens 14.

The stop 22 is adhered to the lens barrel 30 such that it is located at the back-side focal point of the glass lens 14.

Figure 4:
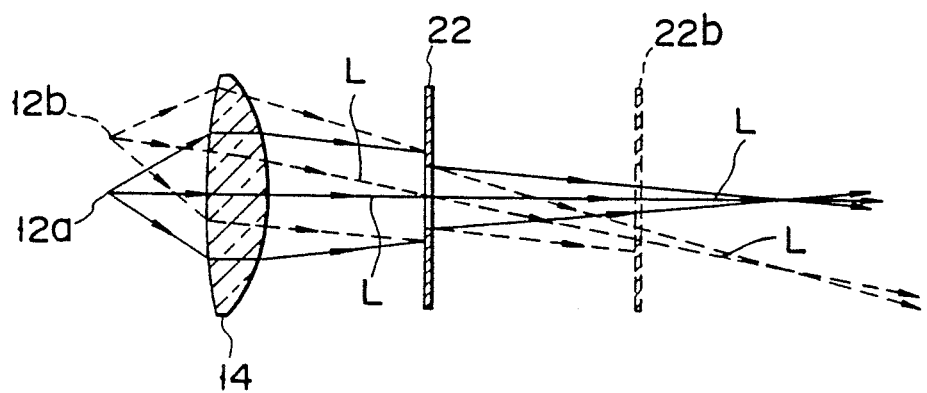
FIG. 4 is a schematic sectional view showing the positional relationship between the lens barrel shown in FIGS. 3A–3C and a stop used for restricting the amount of laser beam generated by a laser.

Referring to FIG. 4, a laser beam L is generated from the light-output point 12a of the laser diode 12. The laser beam L is first converged by the glass lens 14 and restricted by the stop 22 located at the rear-focal plane of the glass lens 14, in such a manner that the laser beam L can form a beam spot of predetermined size. Thereafter, the laser beam L is directed to the photosensitive body 90. Let it be assumed that the stop 22 is located at a position away from the rear-focal plane of the glass lens L, for example, at the position 22b indicated by the broken lines in FIG. 4. In this case, the amount of laser beam L passing through the stop 22 is greatly varied, depending upon the location of the laser-emitting point 12a of the laser diode 12. If the laser-emitting point 12a is shifted to the position indicated by 12b, the amount of laser beam L passing through the stop 22 reduces approximately to half. In other words, in the case where the stop 22 is located at the rear-focal plane of the glass lens 14, the intensity or amount of laser beam L directed to the photosensitive body 90 can remain substantially unchanged, even if the major component of the laser beam generated by the laser diode 12 is shifted from the optical axis of the glass lens 14.

A description will now be given as to how the lenses and optical members incorporated in the above optical unit 2 can have constant imaging surface irrespective of changes in the ambient temperature and moisture.

Let it be assumed that nt denotes a specific temperature coefficient determined with respect to 1° C., αt denotes a coefficient of linear expansion determined with respect to 1° C., Δt denotes a temperature variation (°C.), nm denotes a specific coefficient of moisture absorption determined with respect to 1%, αm denotes a moisture-dependent coefficient of expansion determined with respect to 1%, Δm denotes a variation (%) in the coefficient of moisture absorption, and f denotes the focal length of the third plastic lens 72. In this case, a temperature-dependent variation Δft in the focal length can be approximated as follows:

$$\Delta ft = (-nt + \alpha t)f \cdot \Delta t \quad (1)$$

In the meantime, a moisture-dependent variation Δfm in the focal length can be approximated as follows:

$$\Delta fm = (-nm + \alpha m)f \cdot \Delta m \quad (2)$$

Let it be assumed that the focal length f, the temperature variation Δt and the moisture variation are 45 mm, 30° C. and 1%, respectively. In this case, $nt = -2.09 \times 10^{-4}/°C$. and $\alpha t = 7 \times 10^5/°C$. Therefore, the temperature-dependent variation Δft in the focal length of the third plastic lens 72 can be calculated as below, using the formula (1).

$$\Delta ft = 0.37665 \text{ mm}$$

Since $nm = 8.45 \times 10^{-4}/\%$ and $\alpha m = 2.16 \times 10^{-3}/\%$ in the above-noted case, the moisture-dependent variation Δfm in the focal length of the third plastic lens 72 can be calculated as below, using the formula (2).

$$\Delta fm = 0.059175 \text{ mm}$$

From the temperature-dependent variation Δft and moisture-dependent variation Δfm noted above, the overall variation Δf can be expressed as follows:

$$\Delta f = \Delta ft + \Delta fm = 0.43583 \text{ mm}$$

Since the actual focal length f of the third plastic lens 2 includes the overall variation Δf, it can be expressed as follows:

$$f + \Delta f = f + \Delta ft + \Delta fm = 45.43583 \text{ mm}$$

If the distance $Z_0$ between the focal point of the laser beam emitted from the optical unit 2 with respect to the sub scanning direction and the front principal plane of the third plastic lens 72 is 90 mm, then the distance $Z_1$ between the rear-principal plane of the third plastic lens 72 and a point on which the laser beam must be converged should be equal to 90 mm. However, since the actual distance between the back-side principal point of the third plastic lens 72 and the surface of the photosensitive body 90 includes a variation caused by temperature and moisture, it is expressed as:

$$A_1 + \Delta Z = 91.74332 \text{ mm} \; (\Delta Z = 4\Delta f)$$

Therefore, in the case where the actual focal length includes a variation $\Delta f$, the size of a cross section of the laser beam L can be expressed as follows:

$$W = W_0 \sqrt{1 + \left(\frac{\Delta Z \lambda}{\pi W_0^2}\right)^2} \quad (3)$$

where W is a radius ($\mu$m) of the laser beam L in the state where the actual focal length has been varied from $f$ to "$f+\Delta f$". $W_0$ is a radius ($\mu$m) of the laser beam L in the state where the actual focal length does not vary and is therefore $f$, and $\lambda$ is a wavelength ($\mu$m) of the laser beam.

Assuming that $\lambda=785$ nm and $W_0=25$ $\mu$m, the radius W of the laser beam L can be calculated as 30.78 $\mu$m on the basis of the formula (3), provided that the focal length is not corrected. In this case, the variation in the radius of $W_0$ of the laser beam L is as large as 23% or so.

In order to improve the optical characteristics of a thin lens, the chromatic aberration must be eliminated from the surface of the photosensitive body 90. The condition for enabling this elimination is given by:

$$\sum_{i=1}^{m} \frac{hi^2}{fivi} = 0 \quad (4)$$

where hi is the distance between a point of an i-th lens on which the laser beam is incident and an optical axis center, fi is the focal length of the i-th lens, $vi$ is the partial disperson ratio of the i-th lens, and m is the number of total optical elements.

The formula (4) is used where the wavelength $\lambda$ of the laser beam incident upon each optical element changes and optical elements are different from one another in refractive index. With respect to temperature- and moisture-dependent changes in the refractive power and/or shape of each lens, the "partial dispersion ratio $vi$" can be expressed as below, assuming that a variation in "partial dispersion ratio $vi$" corresponds to a variation in wavelength.

$$\frac{\Delta fi}{fi} = \frac{1}{v'i}$$

If the "partial dispersion ratio $vi$" in formula (4) is replaced with a "pseudo-partial dispersion ratio $v'i$" which depends upon variations in temperature and moisture and if this "pseudo-partial dispersion ratio $v'i$" is assumed to be a constant value determined on the basis of the temperature and moisture dependent variations in the refractive index and shape, then the following formula is derived from formulas (1) and (2):

$$\frac{\Delta fi}{fi} = (-nti + ati)\Delta t + (-nmi + ami)\Delta m = \frac{1}{v'i} \quad (5)$$

If this formula (5) is satisfied, the size of a laser beam L focused on the surface of the photosensitive body 90 is prevented from varying in spite of temperature and moisture changes. In other words, the shift of the imaging surface can be eliminated from the surface of the photosensitive body 90 if the formula below is satisfied.

$$\sum_{i=1}^{m} \frac{hi^2}{fiv'i} = 0 \quad (6)$$

Since the pseudo-partial dispersion ratio $v'i$ is a function dependent on temperature and moisture variations, it is desired that the lenses be made of the same kind of material. If the lenses are made of different materials, formula (6) is difficult to satisfy, in the case where the temperature and moisture vary in a wide range. In the embodiment, the first optical system contains a combination of a glass lens and plastic lenses. In the descriptions below, therefore, how the glass lens is corrected to satisfy formula (6) and how the plastic lenses are corrected to satisfy formula (6) will be considered independently of each other.

Where the plastic lenses are made of the same material, the value of the pseudo-partial dispersion ratio $v'i$ is constant, irrespective of temperature and moisture variations. Thus, formula (6) can be rewritten as:

$$\frac{1}{v'} \sum_{i=1}^{m} \frac{hi^2}{fi} = 0 \quad (7)$$

By satisfying the formula below, therefore, a shift of the imaging surface can be corrected with reference to the surface of the photosensitive body 90 even if the temperature and moisture vary or the wavelength varies in any manner.

$$\sum_{i=1}^{m} \frac{hi^2}{fi} = 0 \quad (8)$$

It should be noted that the $1/vi$ of a mirror 68 included in the polygonal mirror 66 is negligible because its effects are very small in comparison with the effects brought about by temperature and moisture variations or wavelength variations. In the case where a lens is thickened, therefore, formula (8) may be rewritten as below.

$$\sum_{i=1}^{m} \frac{hi^2}{fi} \neq 0 \quad (9)$$

In this case, however, the focal length of the entire optical unit can be corrected if formula (8) is satisfied.

With respect to the glass lens 14, it is only necessary to consider a temperature-dependent variation in the focal length since the glass lens 14 hardly absorbs moisture. Therefore, if the material and shape of the lens barrel 30 are properly determined, the temperature-dependent variation in the focal length of the glass lens 14 can be canceled by the thermal expansion of the lens barrel 30. With respect to the glass lens 14, therefore, the following equations can be obtained:

$$\Delta fi=0 \text{ and } v'i=\infty.$$

As is apparent from formula (4), the first and second plastic lenses should be a combination of a positive-power lens and a negative-power lens. Since the second optical system has small power in the main scanning direction, the first optical system incorporates a glass lens, and also plastic lenses respectively having positive power and negative power which allow the absolute values of focal lengths to become substantially equal to each other. Incidentally, the range within which the second plastic lens is arranged can be widened if the first plastic lens is provided with negative power so as to allow an axial beam to be collimated. With respect to the sub-scanning direction, it should be noted that the second optical system incorporating the third plastic lens includes a mechanism for correcting an error caused by mirror tilting. Therefore, the first optical system should satisfy the following formula:

$$\sum_{i=1}^{m} \frac{hi^2}{fiv'i} < \sum_{i=1}^{m} \frac{hi^2}{fiv'i} \quad (10)$$

where l is a number obtained by adding 1 to the number of lenses incorporated in the first optical system.

It should be noted that the size of the optical system can be reduced by decreasing the power of the first lens of the first optical system and by providing a large part of negative power for the second lens. Therefore, the distance for which the image point of the entire optical system moves in the sub-scanning direction becomes shorter than the distance for which the image point of the third plastic lens moves per se.

Let it be assumed that $v'$ represents the pseudopartial dispersion ratio of the group of lenses incorporated in the optical unit 2, the temperature variation $\Delta t$ is 30° C., and the moisture variation $\Delta m$ is 1%. If, in this case, the values of nt, nm, $\alpha t$ and $\alpha m$ are equal to the values of the conventional case, then $1/v'$ can be calculated as below on the basis of formulas (1) and (2):

$$\frac{1}{v'} = (-nt + \alpha t)\Delta t + (-nm + \alpha m)\Delta m$$
$$= 9.685 \times 10^{-3}$$

Since the glass lens 14 is formed of optical glass BK7, its moisture absorption is negligible. Therefore, $1/v'$ can be calculated as below by substituting $(-3 \times 10^{-6})$ for nt and $(9 \times 10^{-6})$ for $\alpha t$.

$$\frac{1}{v'} = (-nt + \alpha t)\Delta t = 3.6 \times 10^{-4}$$

Since the scanner 50 is formed of aluminum, its moisture absorption is negligible, like the glass lens 14. Therefore, $1/v'$ can be calculated as below by substituting $(-2.36 \times 10^{-5})$ for $\alpha t$.

$$\frac{1}{v'} = \frac{\Delta f}{f}$$
$$= \{R/2 + (R \times \alpha t \times \Delta t/2) - (R/2)\}/(R/2)$$
$$= \alpha t \times \Delta t$$
$$= 7.08 \times 10^{-4}$$

where R is the curvature of the deflecting mirrors 68 of the scanner 50.

The $1/v'$ of the glass lens 14 should be free from adverse effects which ma be caused by wavelength variations. In other words, the value of each of formulas (4) and (6) should be zero. Since l (i.e., the number obtained by adding 1 to the number of lenses incorporated in the first optical system) is 4 and m (i.e., the number of total optical elements) is 5, formulas (4) and (6) can be respectively rewritten as below.

$$\frac{1}{vg} \times \frac{h1^2}{f1} + \frac{1}{va} \times \frac{h4^2}{f4} + \frac{1}{vp} \sum_{i=2,3,5} \frac{hi^2}{fi} = 0 \quad (11)$$

$$\frac{1}{v'g} \times \frac{h1^2}{f1} + \frac{1}{v'a} \times \frac{h4^2}{f4} + \frac{1}{v'p} \sum_{i=2,3,5} \frac{hi^2}{fi} = 0 \quad (12)$$

where $vg$ is the partial dispersion ratio of optical glass BK7;

$v'g$ is the pseudo-partial dispersion ratio which optical glass BK7 has in relation to temperature and moisture variations;

$vp$ is the partial dispersion ratio of PMMA;

$v'p$ is the pseudo-partial dispersion ratio which PMMA has in relation to temperature and moisture variations;

$va$ is the partial dispersion ratio of aluminum; and $v'a$ is the pseudo-partial dispersion ratio which aluminum has in relation to temperature and moisture variations.

The values of $v'g$ and $v'a$ may vary in accordance with the temperature, while the value of $v'p$ may vary in accordance with both temperature and moisture. Therefore, in order to satisfy formulas (11) and (12) in any environmental condition, the optical members of the optical unit 2 are designed in such a manner as to simultaneously satisfy the following three formulas:

$$\frac{h1^2}{vgf1} + \frac{h4^2}{vaf4} = 0 \quad (13)$$

$$\frac{h1^2}{v'gf1} + \frac{h4^2}{v'af4} = 0 \quad (14)$$

$$\sum_{i=2,3,5} \frac{hi^2}{fi} = 0 \quad (15)$$

As mentioned above, temperature and moisture dependent imaging surface shift can be optically corrected with respect to each of the lenses incorporated in the optical unit of the present invention. Further, each plastic lens is prevented from being deformed in spite of temperature and moisture variations. In other words, temperature-and/or moisture-dependent variations in the optical characteristics of each lens can be optically corrected as if an achromatic condition (i.e., a condition enabling elimination of chromatic aberration) were provided. Accordingly, almost all lenses of the first and second optical systems can be made of plastics. In addition, since the third plastic lens of the second focusing optical system need not be mechanically moved, the optical unit of the present invention operates in a stable manner. Moreover, almost all lenses of the first and second optical systems can be made of plastics, the optical unit can be manufactured at low cost.

Additional advantages and modifications will readily occur to those skilled in the art. Therefore, the invention in its broader aspects is not limited to the specific details, and representative devices, shown and described herein. Accordingly, various modifications may ·be made without departing from the spirit or scope of the general inventive concept as defined by the appended claims and their equivalents.

What is claimed is:

1. An optical scanning unit operated under varying temperature and moisture conditions, comprising:
   means for generating a light beam;

means for converting the generated light beam into a convergent light beam, said converting means including a first plastic lens which has power of one polarity in a main scanning direction, and a second plastic lens which has power of a different polarity from said one polarity in the main scanning direction, said first and second lenses having focal lengths which vary in complementary to each other in response to temperature and moisture changes;

means for directing the light beam emerged from the converting means toward an object, so as to scan the object with the light beam; and means for guiding the convergent light beam directed toward the object while processing the convergent light beam to have a cross section of predetermined size and shape.

2. An optical scanning unit according to claim 1, wherein:

said converting means further includes at least one glass lens located on a beam-incident side thereof, said first plastic lens has a lens having negative power in the main scanning direction, and said second plastic lens has a lens having positive power in the main scanning direction and negative power in a sub-scanning direction; and said guiding means includes a third plastic lens.

3. An optical scanning unit according to claim 2, wherein the light beam which has passed through the second plastic lens of the converting means includes an axial light beam component which travels in the main scanning direction and which has substantially the same converging angle as the axial light beam component emerging from the glass lens.

4. An optical scanning unit according to claim 2, wherein said glass lens includes an aspheric lens.

5. An optical scanning unit according to claim 4, wherein said glass lens includes a lens which is made up of: a spherical glass lens portion; and an aspheric-surface layer formed on the spherical glass lens portion and made of a different material from that of the spherical glass lens portion.

6. An optical scanning unit according to claim 2, wherein the first and second plastic lenses and the third plastic lens have substantially the same coefficient of thermal expansion.

7. An optical scanning unit according to claim 2, wherein the first and second plastic lenses and the third plastic lens have substantially the same coefficient of moisture absorption.

8. An optical scanning unit according to claim 1, wherein each of said converting means and said directing means has an optical characteristic which satisfies the relationship below at least in a sub-scanning direction, $$\sum_{i=1}^{m} \frac{hi^2}{fi\nu'i} < \sum_{i=1}^{m} \frac{hi^2}{fi\nu'i}$$

where:

$\nu'i$ is a pseudo-partial dispersion ratio of an i-th optical element from a light beam-incident side ($\nu'i = \infty$ in the case of a glass lens);

hi is a distance between a central axis of an optical element and a point at which an axial light beam is incident on the optical element;

l is a number obtained by adding 1 to the number of lenses incorporated in the converting means; and m is the total number of optical elements, and where a variation $\Delta fi$ to which the focal length fi of an i-th optical element of the converting means is subject in response to a temperature change $\Delta t$ and a moisture change $\Delta m$ is expressed by $$\frac{\Delta fi}{fi} = \frac{1}{\nu'}.$$

9. An optical scanning unit operating under varying temperature and moisture conditions, comprising:

means for generating a light beam;

converting means for converting the generated light beam into a convergent light beam, said converting means including: (a) at least one aspheric lens located on a beam-incident side thereof; (b) a first plastic lens having negative power in a main scanning direction; and (c) a second plastic lens formed of the same material as that of the first plastic lens and having positive power in the main scanning direction and negative power in a subscanning direction;

means, including a plurality of reflecting faces, for directing the light beam output from the converting means toward an object in accordance with rotation of the reflecting faces, so as to scan the object with the light beam; and means for directing the convergent light beam onto a desirable portion on the surface of the object, said directing means including means, which has at least one plastic lens formed of the same material as the first plastic lens of said converting means, each of said converting means and said directing means having an optical characteristic which satisfies the relationship below at least in a sub-scanning direction, $$\sum_{i=1}^{m} \frac{hi^2}{fi\nu'i} < \sum_{i=1}^{m} \frac{hi^2}{fi\nu'i}$$

where:

$\nu'i$ is a pseudo-partial dispersion ratio of an i-th optical element from a light beam-incident side ($\nu'i = \infty$ in the case of a glass lens);

hi is a distance between a central axis of an i-th optical element and a point at which an axial light beam is incident on the optical element;

l is a number obtained by adding 1 to the number of lenses incorporated in the converting means; and m is the total number of optical elements, and where a variation $\Delta fi$ to which the focal length fi of an i-th optical element of the converting means is subject in response to a temperature change $\Delta m$ is expressed by $$\frac{\Delta fi}{fi} = \frac{1}{\nu'}.$$

* * * * *